May 10, 1938.  P. S. SINCLAIR  2,117,222
DANDY ROLL AND CYLINDER MOLD AND METHOD OF MAKING SAME
Filed Jan. 22, 1936  2 Sheets-Sheet 1
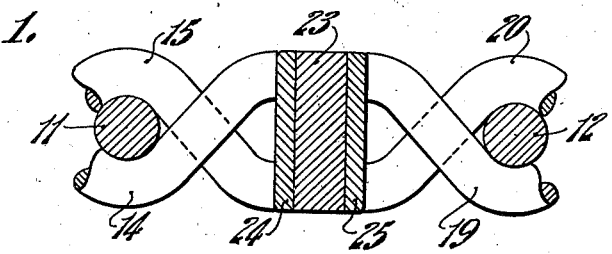
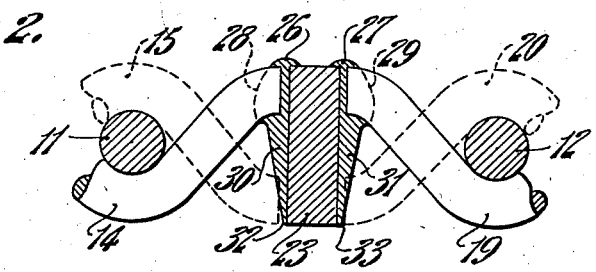
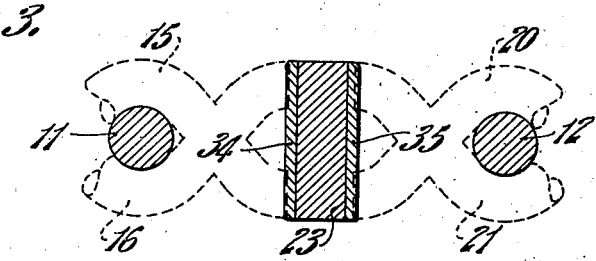
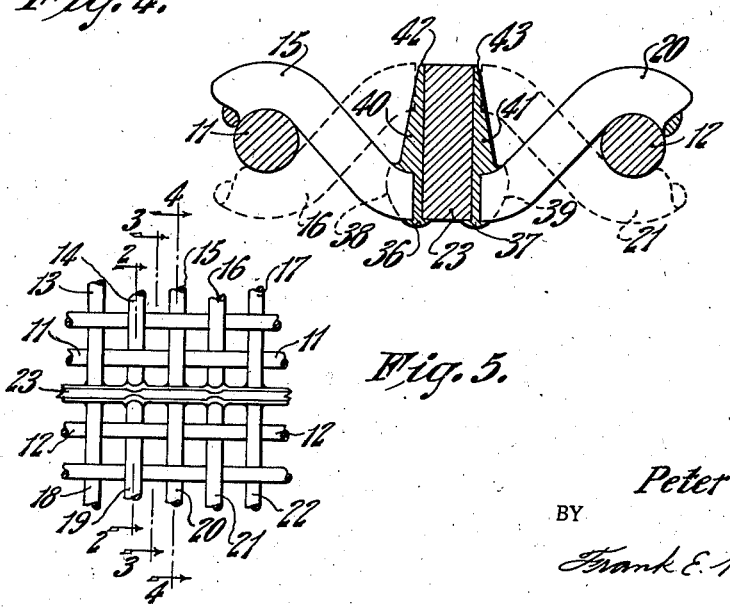
INVENTOR,
Peter S. Sinclair,
BY
Frank E. Haskell
ATTORNEY.

May 10, 1938.   P. S. SINCLAIR   2,117,222
DANDY ROLL AND CYLINDER MOLD AND METHOD OF MAKING SAME
Filed Jan. 22, 1936   2 Sheets-Sheet 2
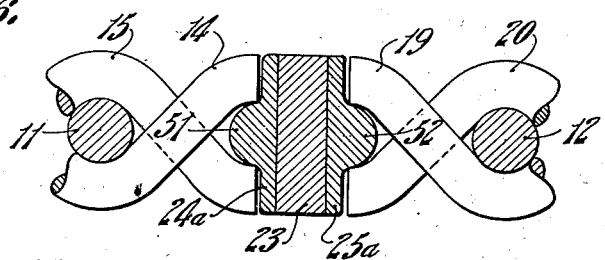
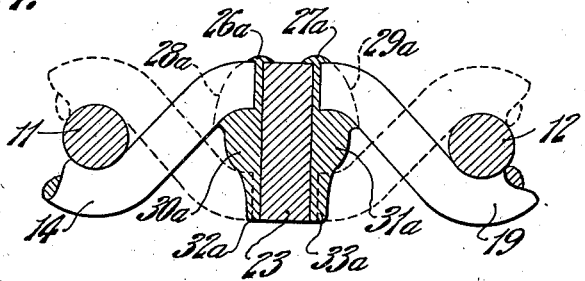
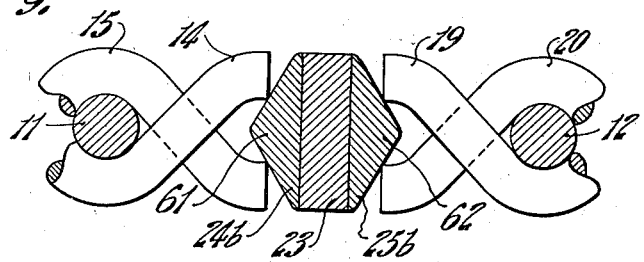
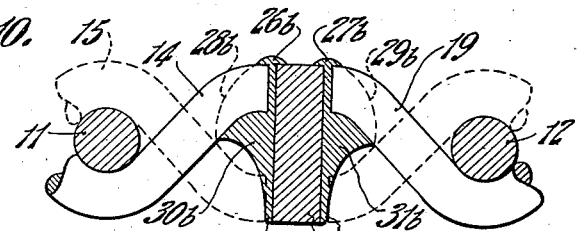
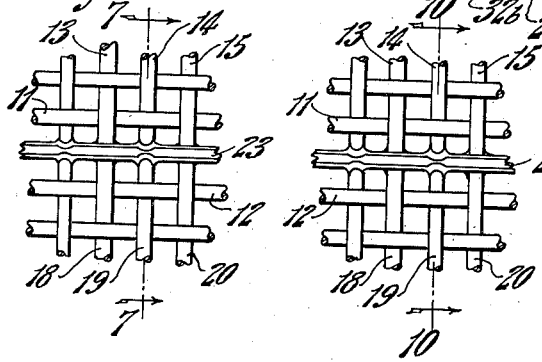
INVENTOR,
Peter S. Sinclair,
BY
Frank E. Haskell
ATTORNEY.

Patented May 10, 1938

2,117,222

UNITED STATES PATENT OFFICE 2,117,222

DANDY ROLL AND CYLINDER MOLD AND METHOD OF MAKING SAME

Peter S. Sinclair, Holyoke, Mass.

Application January 22, 1936, Serial No. 60,269

7 Claims. (Cl. 245—10)

This invention relates to dandy rolls and cylinder molds used in the manufacture of paper and more particularly to the manner in which the woven wire fabric which covers such rolls is joined together at the edges.

Heretofore dandy rolls have usually had a sewed seam. This sewing is done by passing a wire back and forth from one side of the seam to the other interlacing with one or two or more of the wires on each side which extend parallel to the seam. Such seams have several objectionable features. One objection is that the wire used for the sewing fills up the meshes or interstices of the woven wire fabric to a considerable extent and because of the decreased drainage resulting therefrom when the dandy roll or cylinder mold is placed in operation there is left in the paper a mark, a defect more or less serious depending on the quality of the paper, which is known as "seam-marking". Also such sewed seams are never as strong as the wire fabric itself and sometimes pull out soon after the dandy roll has been placed in operation. While the quality of the workmanship no doubt has a great deal to do with the frequency with which this occurs nevertheless it may be safely stated that all manufacturers of such apparatus have experienced it to some extent.

It has been suggested and some attempts have been made heretofore to join the edges together by means of solder and thus to produce a soldered seam instead of a sewed seam. There are a number of difficulties encountered in such a construction and while it is not necessary to enumerate them all there is one which will be described somewhat in detail as it is this particular difficulty which is an object of the present invention to eliminate or at least to make such improvements in connection therewith as to render it of little practical importance. This difficulty has to do with the tendency of the solder to spread away from the place where it is desired to have it. This has a double consequence. In the first place the union of the parts is not complete and does not constitute a satisfactory soldered joint. If the solder spreads away too much there may be places where there is no union of the wires at all. The second consequence is that the solder may run into and fill up the meshes of the wire fabric either partly or completely and thus accentuate the seam marking. There has heretofore been a tendency to use an excess of solder, so that even after a certain amount has spread away there will nevertheless be sufficient left to produce a satisfactory joint, and this very excess has increased the tendency to clog the meshes and cause seam marking.

There is a somewhat similar seam or joint employed in the manufacture of Fourdrinier wires for paper-making machines. These also have usually been sewed seams although recently there have been more or less successful attempts to produce a soldered joint or seam. While there are similarities in Fourdrinier and dandy-roll seams there are nevertheless very important differences between the requirements for the two types of seams and it is important to bear this in mind because it does not by any means necessarily follow that the production of a certain type of improved seam for use in connection with Fourdrinier wires can also be used satisfactorily in dandy rolls and cylinder molds. In the first place it is desirable to have the wire on a dandy roll as taut and tight as possible. This is not true of a Fourdrinier wire which is in the form of an endless belt. It is a cardinal principle in the operation of moving belts that the tension be kept as low as possible. Any such tension as is used on a dandy roll applied to a Fourdrinier belt would result in all kinds of trouble such as overloading the bearings, springing the shaft around which the belt passes, and also increasing breakage due to the continuous cycles of flexure under severe tension. As a matter of fact Fourdrinier belts never do operate under anywhere near the same tension as the covering of a dandy roll. Furthermore the feature of operation of continually being flexed as it passes around the rolls upon which it is supported imposes on a Fourdrinier wire a requirement for a certain amount of flexibility which is not needed in a dandy roll.

In one sense a moderate amount of clogging of the meshes and seam marking would not be so important in a Fourdrinier seam as in a dandy-roll seam. Both produce an undesirable mark it is true but the Fourdrinier mark does not appear so frequently in the paper web. This is because the Fourdrinier belt is 40 to 100 feet long while the dandy roll is only 7 to 24 inches in diameter. Because of this frequency of reoccurrence a degree of seam marking which would be merely objectionable in a Fourdrinier belt may be intolerable in a dandy roll. It is also to be noted that the seam in a Fourdrinier wire can be, and generally is, made when the wire is not under tension and therefore relatively easy to handle while the seam in a dandy roll must be made while the wire is under a tension which is very considerable. Other differences will be mentioned hereinafter but for the present it should be emphasized that a seam in a dandy roll presents serious difficulties not encountered at all in the making of seams in Fourdrinier wires which at first would seem to be a very analogous type of construction and use.

While both "dandy roll" and "cylinder mold" are referred to herein it is the former that is used the more frequently but it is to be understood that so far as the present invention is concerned a cylinder mold may be considered to be the full equivalent of a dandy roll and in both specification and claims "dandy roll" is to be considered generic to both cylinder molds and dandy rolls without the necessity of employing some indefinite or little used term for the purpose of including both structures.

It is an object of the present invention, broadly stated, to produce a seam or joint in a dandy roll or cylinder mold which does not require any sewing.

Another object of the invention is to produce a dandy-roll seam that will be as strong or even stronger than the wire cloth in which it is made.

A still further object of the invention is to produce a dandy-roll seam that will have no tendency to stretch and thus loosen the wire on the roll.

And it is also an object of the invention to produce a seam for dandy rolls that will offer practically the same area for drainage through the interstices as is offered at other parts of the wire fabric where there is no seam.

More specifically it is one of the objects of the invention to provide a soldered seam or joint of the character described which shall have means employed in the construction thereof to cause most of the solder to take its position near the ends of the abutting wires and in which a very much smaller quantity is allowed to take its position away from the ends of the wires to be fastened together.

Still more specifically stated, it is an object of the invention to provide a reinforcing member between the edges of the wire fabric at the seam and against which the ends of the warp wires may abut and to which they may be soldered or brazed.

The foregoing and other objects of the invention will readily appear to those skilled in the art to which it appertains by a consideration of the following description of different embodiments thereof taken in connection with the accompanying drawings in which Fig. 1 is a longitudinal section, greatly enlarged, of the wire fabric of a dandy roll, taken at the joint and transversely thereof, and ready for the brazing or soldering operation;

Fig. 2 is a section similar to Fig. 1, but after the brazing or soldering operation, taken on the line 2—2 of Fig. 5, and shows the nature of the joint where two upper warp wires are in abutting relationship;

Fig. 3 is a section similar to Fig. 2, taken on the line 3—3 of Fig. 5, and shows the appearance of the seam connecting member as it appears midway between two warp wires;

Fig. 4 is a section similar to Fig. 2, taken on the line 4—4 of Fig. 5, and shows the nature of the joint at two lower opposed warp wires;

Fig. 5 is a top plan view of a portion of the wire fabric of the dandy roll as seen near the joint or seam;

Fig. 6 is a longitudinal section, greatly enlarged, similar to Fig. 1, of a modified form of joint in the wire fabric of a dandy roll, as it appears ready for the brazing or soldering operation;

Fig. 7 is a section similar to Fig. 6 showing the joint as it appears after the soldering or brazing operation and is a section taken on the line 7—7 of Fig. 8;

Fig. 8 is a top plan view of a portion of the wire fabric and joint shown in Figs. 6 and 7;

Fig. 9 is a longitudinal section, greatly enlarged, similar to Figs. 1 and 6, of another modified form of joint in the wire fabric of a dandy roll, as it appears ready for the brazing or soldering operation;

Fig. 10 is a section similar to Fig. 9 showing the joint as it appears after the soldering or brazing operation and is a section taken on the line 10—10 of Fig. 11; and Fig. 11 is a top plan view of a portion of the wire fabric and joint shown in Figs. 9 and 10.

Referring to the drawings more in detail and particularly to the embodiment of the invention shown in Figs. 1 to 5, the reference character 11 indicates a weft wire near the edge of the wire fabric on the left of the proposed seam or joint as seen in Fig. 1. The reference character 12 indicates a weft wire near the edge of the wire fabric on the right of the proposed seam. Referring to Fig. 5 the warp wires on the same side of the seam or joint as the weft wire 11 are indicated by the reference characters 13, 14, 15, 16, and 17 while those on the other side are indicated by the reference characters 18, 19, 20, 21, and 22. Warp wires 14 and 15 are shown to the left of the joint and warp wires 19 and 20 are shown to the right of the joint. The warp wires 14 and 19 are nearest to the observer, the warp wire 14 extending from under the weft wire 11 upwardly and toward the right and the warp wire 19 extending from under the weft wire 12 upwardly and toward the left while the warp wires 15 and 20 are positioned behind the warp wires 14 and 19, the warp wire 15 extending from above the weft wire 11 downwardly toward the right and the warp wire 20 extending from above the weft wire 12 downwardly and toward the left. It will be noted that as shown in the different figures of the drawings the ends of the warp wires 14 and 19 are in alinement with each other both horizontally and vertically. The same is true of the pairs 15—20, 16—21, 17—22, and 13—18. It will also be noted that the warp wires 13, 14, 15, 16, and 17 which appear above the joint as seen in Fig. 5 and a part of which appear to the left of the joint in Fig. 1 terminate at a point corresponding approximately with the center of the position of the last weft wire to be removed. The warp wires at the other side of the joint, 18, 19, 20, 21, and 22 are also cut off at a point corresponding with the center of the last weft wire to be removed. These factors, the horizontal alinement, the vertical alinement, and the lengths of the projecting warp wires give the same relationship between the warp wires on opposite sides of the joint as though they had originally been the same wire and had been cut. This is the relationship shown in the drawings although, as a matter of fact, it is not the relationship which always occurs as will be more fully explained hereinafter.

While throughout both specification and claims the warp wires are described as extending circumferentially and the weft wires in the other direction it is possible in the actual construction to interchange this relationship so that the weft wires extend circumferentially and the warp wires parallel to the axis. Both dandy rolls and cylinder molds have been actually constructed in this manner although as at present advised it does not seem to be so satisfactory, all things considered, as the other way. However, even though for the sake of definiteness and clearness, only one form of construction has been set forth in the specification, drawings and claims, it is to be understood that it is intended that the invention be considered broad enough to include any such mere reversal of parts.

There is shown in Fig. 1, between the opposed ends of the warp wires on the two sides of the joint, a seam connecting member which is in the form of a laminated structure comprising a middle reinforcing member 23, and two adjacent layers of fusible material 24 and 25 on opposite sides of the middle reinforcing member. The middle reinforcing member 23 is preferably of the same or similar material to that from which the wires in the woven wire fabric are drawn. It is chosen primarily for its strength and should not melt or become deformed under the action of heat more readily than the wires. It is preferably elongated in cross-sectional form with the greater dimension disposed perpendicular to the plane of the wire fabric and with the smaller dimension in the same general direction as the plane of the fabric or the warp wires thereof. More specifically the cross section is that of a rectangle with the larger dimension being approximately equal to the total thickness of the wire fabric and the smaller dimension being approximately equal to the diameter of the wires in the wire fabric and preferably no greater than such diameter. This arrangement serves to provide a broad surface against which the ends of the warp wires can abut, as will be described more fully, and also does not reduce the size of the interstices through which the paper stock is drained, since the size and obstruction in the direction of flow of the drainage is approximately the same as that of a weft wire. The layers of fusible material 24 and 25 are also of rectangular cross-sectional form although they may be somewhat thinner. They are preferably of hard silver solder having a low melting point. With the wire fabric around the supporting structure of the dandy roll and the two ends or edges thereof opposed to each other, as shown in Fig. 1, and with the three-part seam member positioned between the opposing edges of the woven wire fabric, clamps are applied which tend to bring the edges together and then heat in the form of a blow torch or otherwise is applied to the joint. As the laminations of the hard solder become softened the ends of the warp wires are drawn slightly closer together as seen in Fig. 2 and the solder draws away from the bottom of the reinforcing member 23 and toward the ends of the warp wires 14 and 19, some of it appearing above the reinforcing member 23 and abutting warp wires as indicated at 26 and 27, and also at the sides of the warp wires 14 and 15 as indicated by dotted lines at 28 and 29. The solder is also drawn toward the underside of the wires 14 and 19 which provides a greater mass of the solder at these places as indicated at 30 and 31, serving to reinforce and strengthen the seam still further. It will be noted that most of the solder at the lower portion of the reinforcing member 23 (see Fig. 2) has been drawn away leaving it quite thin at the lower left-hand corner 32 and the lower right-hand corner 33.

Fig. 3, being a section taken midway between warp wires, shows how the solder draws away toward the joint leaving it thinner both at the left at 34 and at the right at 35.

In Fig. 4, the projecting ends of a pair of lower warp wires are shown abutting against the seam connecting member. The solder gathers around the ends 13 and 18, protruding below at 36 and 37 and at the sides at 38 and 39. The reinforcing gathering of the solder above the wires 13 and 14 is shown at 40 and 41. There is left only a thin layer at the top at 42 and 43.

In the modification shown in Figs. 6, 7, and 8 the seam connecting member has a middle reinforcing member 23 similar to the corresponding member of Figs. 1 to 5. Positioned on opposite sides of this middle reinforcing member 23 are layers of fusible material 24a and 25a. That portion of each of the layers 24a and 25a which lies adjacent to the member 23 is similar to the corresponding layer 24 or 25 shown in Fig. 1 and is substantially rectangular in cross section. In addition to the rectangular portion the layer 24a is provided with a protruding portion or rib 51 of substantially semi-circular cross section and of such a size that it fits into the space between the two ends of the warp wires 14 and 15 and from which the weft wire has been removed. The layer 25a on the opposite side of the middle member 23 is provided with a similar rib 52.

After the seam connecting member has been placed in position between the opposed edges of the wire fabric with the ribs 51 and 52 lying between the warp wires as shown in Fig. 6, heat is applied as explained with respect to the other figures and while under the softening effect thereof the clamps draw the ends of the opposed warp wires slightly nearer together. Some of the solder protrudes above the member 23 and the wires 14 and 19 as indicated at 26a and 27a. A much larger amount of solder gathers at the sides of the warp wires at 28a and 29a and beneath them at 30a and 31a than was the case with the form of seam connecting member shown in Figs. 1 to 5. The solder, to a large extent, draws away from the lower corners of the reinforcing member 23 as indicated at 32a and 33a.

The form of seam connecting member shown in Fig. 6, having a protruding semi-circular rib, serves two purposes. The ribs 51 and 52 by entering into the spaces left vacant by the removal of the weft wires serve to bring the edges of the wire fabric and the seam connecting member into alinement with each other. Moreover the cross section of the layer of solder or other fusible material 24a furnishes a substantially greater amount of such material than in Fig. 1 and also furnishes it very nearly in the position in which it is most desirable to have it. The consequence of this is that the joint is somewhat stronger but there is also, because of the greater amount of material at the joint, more of a tendency to produce a mark in the paper.

In the modification shown in Figs. 9, 10, and 11 the reinforcing middle member 23 has positioned at each side thereof a layer of fusible material, 61 and 62 respectively, of triangular cross section, the base of the triangle extending the full width of the member 23 and the apex forming a rib of somewhat different shape than the rib of Fig. 6. The protruding rib of the layer 61 is shown in Fig. 9 as being positioned between the ends of the two warp wires 14 and 15 and the protruding rib of the layer 62 is shown as being positioned between the ends of the two warp wires 19 and 20. As in the form of the invention shown in Fig. 6 the rib serves to assist in positioning the seam connecting member in exact alinement in the middle of the thickness of the wire fabric. As the heat is applied and the ends of the clamps draw the ends of the warp wires together a small amount of the solder is squeezed out at the top as indicated at 26b and 27b. A very much larger amount of the solder is drawn up on the sides of the warp wires as indicated at 28b and 29b and also a very large amount is drawn up to the under side of the warp wires as indicated at 30b and 31b. The layer is drawn away from the bottom edge of the member 23 until it is relatively quite thin as shown at 32b and 33b.

In the form of invention shown in Figs. 9, 10, and 11 there is very much more solder in the layer than in either of the first two forms of the invention and as a result the completed seam or joint is very much stiffer and very much stronger than in either of the other two forms. In general the form of the invention shown in Figs. 1 to 5 is best for those situations which do not require very great strength or where it is highly desirable that the seam marking shall be as little as possible. The form of the invention shown in Figs. 6 to 8 is best adapted for those situations where the seam should be somewhat stronger but the requirements for strength are not the very greatest and where the requirement still exists that the seam marking shall not be too great. The form of the invention shown in Figs. 9 and 10 is best adapted for those situations where the very greatest strength is required and for that reason the seam marking may be greater than in either of the other two forms of the invention although it is still far less than in sewed seams as they have been constructed heretofore.

The word solder as used in this specification is intended to cover all types of connections by means of fused metal whether such connections would ordinarily be called soldering or brazing or welding and unless the context would otherwise limit the meaning all three forms of connections are considered to be within the purview of the present invention.

It is to be understood that the thickness of the three-part seam member is so chosen that the size of the meshes on each side of the joint is not smaller than the size of the meshes elsewhere in the fabric and the drainage is for all practical purposes unimpaired so that there is almost no seam marking at all. Attention is again called to the fact that the seam member is elongated in a direction perpendicular to the surface of the wire fabric and is of a smaller dimension in the longitudinal direction of the fabric. It is thus possible to obtain a joint or seam that has a strength equal to or greater than that of the fabric itself and one that at the same time gives equally satisfactory drainage. This feature also affords another point of contrast with joints or seams in Fourdrinier wires. A joint made as shown in the drawings and described above would be very unsatisfactory in a Fourdrinier wire because of the stiffness and resistance to bending as the wire at the joint passes around the rolls. On the other hand the strength of joint attained would not be considered nearly as important and there would not be the necessity for it that there is in a dandy roll or cylinder mold.

The different figures of the drawings show the warp wires as being in exact alinement on opposite sides of the seam. This is true throughout a part of the length of the seam but not everywhere. The diameter of a dandy roll is not exactly the same from one end to the other. Sometimes this is so because the center is purposely made larger or the roll is said to be crowned. In other cases the difference in diameter is simply due to irregularities. In any event it becomes necessary to remove more weft wires in some parts of the seam than in others. The result is that the manner in which the warp wires aline themselves is constantly shifting along the seam. In one place the warp wires may be in alinement as shown in the different figures of the drawings. A little further along the warp wires are no longer in alinement but are staggered with respect to each other. Still further along they appear in alinement in looking down upon them but an upper warp wire is opposite a lower warp wire. The form of soldered connections under all these varying conditions has not been shown as those skilled in the art will be able to amplify the foregoing illustrations to apply to such shifting relationships. It should be stated, however, that this is one more difference which distinguishes the problem of providing a seam in a dandy roll from that of providing a seam in a Fourdrinier wire. In the latter case there is a certain amount of slack in use, as with all belts, and moreover the joint is usually made before the wire is in place and therefore not under tension. In such endless belts it is considered desirable to stagger the opposed warp wires uniformly clear across the seam as flexibility is deemed more important than strength which is the chief desideratum in dandy rolls.

It is to be understood that the foregoing embodiments of the invention have been selected for purposes of illustration only and various changes may be made therein without departing from the spirit and scope of the invention as defined in the subjoined claims.

I claim:

1. A seam for woven wire comprising a woven wire fabric having two opposed edges on opposite sides of the seam, said edges extending parallel to the weft wires and transversely of the warp wires, the weft wire nearest to each edge being positioned slightly back therefrom so that the ends of the warp wires project beyond said weft wires, a seam connecting member positioned between the opposed ends of said projecting warp wires comprising an inner reinforcing member and a layer of fusible material on each side thereof, each layer having a longitudinal projecting rib disposed along the middle thereof, said projecting ends of the warp wires abutting against the connecting member with the alternate wires diverging so as to provide a space in which the rib is positioned, said warp wires being secured to said seam connecting member by means of said fusible material.

2. A seam for woven wire comprising a woven wire fabric having two opposed edges on opposite sides of the seam, said edges extending parallel to the weft wires and transversely of the warp wires, the weft wire nearest to each edge being positioned slightly back therefrom so that the ends of the warp wires project beyond said weft wires, a seam connecting member positioned between the opposed ends of said projecting warp wires comprising an inner reinforcing member and a layer of fusible material on each side thereof, each layer having a longitudinal projecting rib of substantially semi-circular form disposed along the middle thereof, said projecting ends of the warp wires abutting against the connecting member with the alternate wires diverging so as to provide a space in which the rib is positioned, said warp wires being secured to said seam connecting member by means of said fusible material.

3. A seam for woven wire comprising a woven wire fabric having two opposed edges on opposite sides of the seam, said edges extending parallel to the weft wires and transversely of the warp wires, the weft wire nearest to each edge being positioned slightly back therefrom so that the ends of the warp wires project beyond said weft wires, a seam connecting member positioned between the opposed ends of said projecting warp wires comprising an inner reinforcing member and a layer of fusible material on each side thereof, each layer being in the cross-sectional form of a triangle with its base positioned against said reinforcing member and its apex constituting a longitudinal rib disposed along the middle of said seam connecting member, said projecting ends of the warp wires abutting against the connecting member with the alternate wires diverging so as to provide a space in which the rib is positioned, said warp wires being secured to said seam connecting member by means of said fusible material.

4. The process of making a seam in the woven wire fabric covering of a dandy roll, comprising removing the last weft wire adjacent and parallel to the edge of the wire on each side of the proposed seam, cutting the ends of the projecting warp wires to a length corresponding substantially to the position of the center of the removed weft wire, placing a seam connecting member with longitudinal ribs of fusible material between the opposed edges of said fabric with the ribs lying between the projecting ends of the warp wires and said seam connecting member having other fusible material between the opposed ends of the warp wires, drawing the ends of the warp wires tightly against the seam connecting member, and heating the seam connecting member and abutting ends of the warp wires to produce a soldered connection and at the same time drawing the opposed ends of the warp wires still closer against the seam connecting member and into the fused solder.

5. A seam for woven wire comprising a woven wire fabric with two sets of wires disposed at right angles to each other, said fabric having two opposed edges on opposite sides of the seam, said edges extending substantially parallel to one set of wires and substantially perpendicular to the other set of said wires, the perpendicular wires having a length such that their ends project a slight distance beyond the respective parallel wires positioned nearest to the edge on opposite sides of the seam, a seam connecting member positioned between the opposed ends of said perpendicular wires comprising an inner reinforcing member and a layer of fusible material on each side thereof, each layer having a longitudinal projecting rib disposed along the middle thereof, a portion of the ends of the perpendicular wires of each edge of the fabric abutting against the connecting member at one side of the rib and the other ends of said edge abutting against the connecting member at the other side of the rib, said perpendicular wires being secured to said seam connecting member by means of said fusible material.

6. A seam for a woven wire fabric having two opposed edges on opposite sides of the seam, said fabric having one set of wires disposed substantially parallel to said seam and another set of wires disposed perpendicular to said parallel set and interwoven therewith so as to pass from one surface of the fabric to the other and crossing each other midway between successive parallel wires, the ends of the perpendicular wires at the seam at both sides thereof extending beyond the last parallel wire and beyond the crossing of the perpendicular wires so as to provide a space between the ends of the wires, a seam connecting member having an inner reinforcing member and a layer of fusible material on each side thereof positioned between the abutting ends of the perpendicular wires, each layer of fusible material having a longitudinal rib positioned in said space, said ends being secured to said reinforcing member by means of said fusible material.

7. The process of making a seam in a woven wire fabric which has two sets of wires disposed at right angles to each other and which has two opposed edges one on each side of the proposed seam extending substantially parallel to one set of said wires and substantially perpendicular to the other set of said wires, comprising removing the last parallel wire adjacent to the proposed seam on each side thereof, cutting the ends of the projecting perpendicular wires on each side of the seam to a length corresponding substantially the position of the center of the removed wire, placing a seam connecting member having a longitudinal rib of fusible material on each side thereof between the opposed edges of said fabric with each rib lying between the projecting ends of the perpendicular wires at its side of the seam connecting member, said seam connecting member having other fusible material which is at the same time placed so as to have the ends of the perpendicular wires abutting thereagainst, heating the seam connecting member and abutting ends of the wires and at the same time maintaining the ends of the perpendicular wires tightly in place against the seam connecting member so as to produce a soldered connection.

PETER S. SINCLAIR.